United States Patent
Mazzaferro et al.

(10) Patent No.: US 9,375,798 B2
(45) Date of Patent: Jun. 28, 2016

(54) THREADED CONNECTION WITH IMPROVED ROOT THREAD PROFILE

(71) Applicants: Gastón Mauro Mazzaferro, Buenos Aires (AR); Tommaso Coppola, Rome (IT); Stefano Amato, Rome (IT); Ramón Alberto Aguilar Armendariz, Veracruz (MX); Philippe Pierre Darcis, Veracruz (MX)

(72) Inventors: Gastón Mauro Mazzaferro, Buenos Aires (AR); Tommaso Coppola, Rome (IT); Stefano Amato, Rome (IT); Ramón Alberto Aguilar Armendariz, Veracruz (MX); Philippe Pierre Darcis, Veracruz (MX)

(73) Assignee: Tenaris Connections Limited, Kingstown, St. Vincent & the Grenadines ( * ) Notice: Subject to any disclaimer, the term of this patent is extended or adjusted under 35 U.S.C. 154(b) by 373 days.

(21) Appl. No.: 14/158,187

(22) Filed: Jan. 17, 2014

(65) Prior Publication Data
US 2014/0182426 A1    Jul. 3, 2014

Related U.S. Application Data

(62) Division of application No. 13/315,354, filed on Dec. 9, 2011, now Pat. No. 8,668,232.

(51) Int. Cl.
*B23G 1/22* (2006.01)
*B23G 1/02* (2006.01)
*E21B 17/042* (2006.01)
*F16L 15/00* (2006.01)
*F16L 15/06* (2006.01)
*B23G 5/00* (2006.01)

(52) U.S. Cl.
CPC ............... *B23G 1/02* (2013.01); *E21B 17/042* (2013.01); *F16L 15/001* (2013.01); *F16L 15/06* (2013.01); *Y10T 82/10* (2015.01); *Y10T 408/03* (2015.01)

(58) Field of Classification Search
CPC ... B23G 7/00; B23G 2210/47; B23G 2240/36
See application file for complete search history.

(56) References Cited

U.S. PATENT DOCUMENTS

| 4,076,436 | A | | 2/1978 | Slator et al. | |
|---|---|---|---|---|---|
| 4,405,267 | A | * | 9/1983 | Stoken | B23G 1/48 408/101 |
| 4,501,519 | A | * | 2/1985 | Leon | B23G 1/52 269/168 |
| 4,549,754 | A | | 10/1985 | Saunders et al. | |
| 4,799,844 | A | | 1/1989 | Chuang | |
| 5,060,740 | A | | 10/1991 | Yousef et al. | |
| 5,163,523 | A | | 11/1992 | Yousef et al. | |
| 5,735,658 | A | * | 4/1998 | Harle | B23G 5/04 408/229 |

(Continued)

FOREIGN PATENT DOCUMENTS

WO    WO2006092649    9/2006

OTHER PUBLICATIONS

PCT International Search Report, PCT/IB2012/056597, Feb. 25, 2013, 3 pages.

*Primary Examiner* — Will Fridie, Jr.
(74) *Attorney, Agent, or Firm* — Fish & Richardson P.C.

(57) ABSTRACT

A threaded connection design having a double ellipse in the thread root for reducing stress fatigue is illustrated in this disclosure. The root groove includes a first portion comprising a first elliptical surface being part of a first ellipse. The root groove further includes a second portion comprising a second elliptical surface, being part of a second ellipse, and the second elliptical surface being joined tangentially at a first end to the first elliptical surface at a junction point that defines the bottom of the root groove. The second elliptical surface is joined tangentially at a second end to the load flank.

30 Claims, 9 Drawing Sheets

(56) References Cited

U.S. PATENT DOCUMENTS

| | | | |
|---|---|---|---|
| 5,931,511 A | 8/1999 | DeLange et al. | |
| 6,030,004 A | 2/2000 | Schock et al. | |
| 6,050,610 A | 4/2000 | Enderle et al. | |
| 6,138,540 A * | 10/2000 | Niemi | B23B 27/065 407/113 |
| 6,322,110 B1 | 11/2001 | Banker et al. | |
| 6,609,735 B1 | 8/2003 | DeLange et al. | |
| 6,729,658 B2 | 5/2004 | Verdillon | |
| 6,755,447 B2 | 6/2004 | Galle, Jr. et al. | |
| 6,848,724 B2 | 2/2005 | Kessler | |
| 7,210,710 B2 | 5/2007 | Williamson et al. | |
| 7,416,374 B2 | 8/2008 | Breihan et al. | |
| 7,780,202 B2 | 8/2010 | Breihan et al. | |
| 7,845,687 B2 | 12/2010 | Roussie | |
| 7,900,975 B2 | 3/2011 | Nakamura et al. | |
| 8,146,959 B2 | 4/2012 | Roussie | |
| 2003/0038476 A1 | 2/2003 | Galle et al. | |
| 2006/0199654 A1* | 9/2006 | Lindh Adcock | B23G 7/02 470/204 |
| 2007/0286694 A1* | 12/2007 | Glimpel | B23G 5/06 409/66 |
| 2010/0077819 A1* | 4/2010 | Ishii | B23B 31/16 72/68 |
| 2011/0042946 A1 | 2/2011 | Santi | |

* cited by examiner

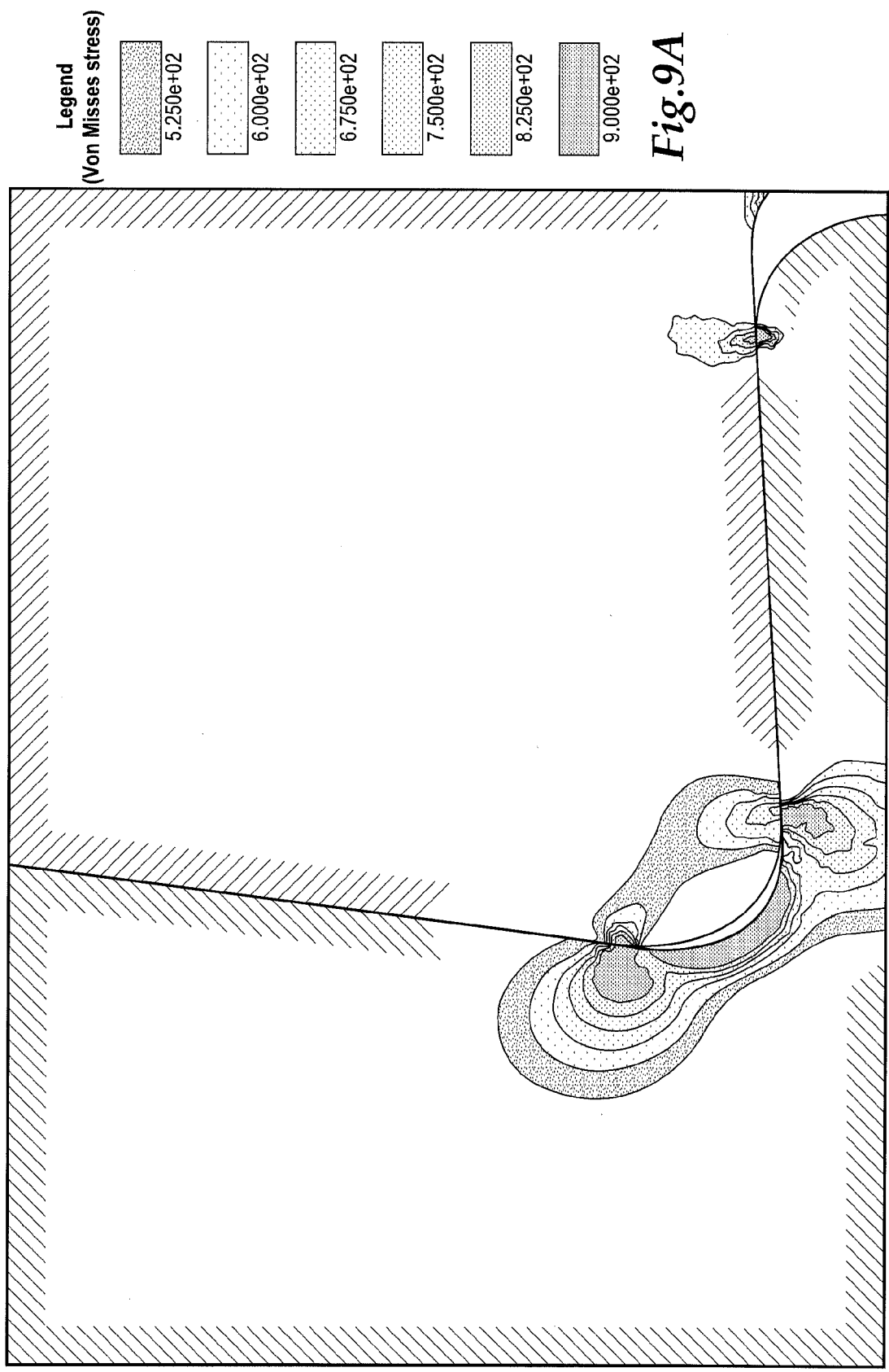

THREADED CONNECTION WITH IMPROVED ROOT THREAD PROFILE

This application is a Divisional of and claims the benefit of priority to U.S. patent application Ser. No. 13/315,354, filed on Dec. 9, 2011 and entitled "Threaded Connection with Improved Root Thread Profile", the contents of which are hereby incorporated by reference.

FIELD OF INVENTION

This invention relates in general to pipe connections, and in particular to a threaded connection having an improved root thread profile design that improves fatigue resistance.

BACKGROUND

Searching for oil or more generally hydrocarbons is becoming more demanding in terms of hardware and devices in recent years because oil and gas fields (reservoirs) are located deeper in the earth or in places difficult to reach.

Numerous onshore drilling and production activities require tubular connections having high levels of fatigue resistance; for example, drilling applications and thermal applications.

Additionally, exploring and producing hydrocarbon fields in deep water environments (offshore applications) has increased and necessitates tubular connections which are more resistant to environmental challenges such as fatigue and corrosion.

Off-shore platforms have production facilities located above the sea surface. These facilities are frequently used for exploitation of hydrocarbon fields lying below the sea floor. These platforms are anchored to the sea bottom and tubular strings are used to deliver the hydrocarbons from wells drilled into reservoirs below the sea bed. The tubular strings are sometimes referred to in the art as "risers."

These riser strings are immerged in the sea and are subject to movements caused by sea currents and surface wave movements. Because of continuous and periodical movements of the sea, the tubular strings do not remain immobile, but are subject to lateral movements of small magnitude which can produce deformations in certain parts of the tubular connections. These riser strings must withstand loads which induce fatigue stresses in the tubes and the tubular connections, in particular with respect to the zone of the threaded connection. These stresses tend to cause ruptures in the tube and/or connection in the vicinity of the thread and there is a need to improve the fatigue resistance of the threaded connections.

Some prior art patents, for example U.S. Pat. No. 7,780, 202 and U.S. Pat. No. 6,609,735 disclose flank-to-flank ("FtF") engagement type connections which are subject to fatigue, including riser connectors.

Other prior art conventional interference fit threaded connections (including API buttress-style thread forms), have profiles in which the threads engage along only one thread flank upon make up. This type of connection must completely unload the contacting flank, undergo relative movement between the pin and the coupling until the opposite flanks contact, and then transfer load to the newly contacting flank. Repeated, cyclical side loading and load transfers make these connection types especially susceptible to fatigue failures.

In flank-to-flank (FtF) threads, upon make up, contact is made between both stabbing and load flanks Clearance exists between crests and roots. The thread is designed with the thread teeth of one member being wider than the mating teeth of the other member (e.g., flank to flank interference). Due to the inclination of the flanks, contact forces (normal to the surface of the flank) have the main component placed in an axial direction, pressing the material that forms the thread teeth. To achieve the flank to flank interference, contact forces work mainly on the elasticity of the teeth. The elasticity of the teeth is very low so high contact pressures are reached during make up. This explains why FtF threads have high galling tendency during make up.

Additional drawbacks of FtF threads are present for very sloping angles of the lead-in flank of the thread, measured compared to a perpendicular surface to the pipe's axis. The compression action of the connection is unsatisfactory because this type of solution aids the onset of the phenomenon defined as "jump-in," when the compression forces exceed certain limits. Jump-in occurs when the male pipe segment slides into the female segment, exceeding the resistance given by the threading of the two pieces. This phenomenon occurs more frequently the more inclined the angle of thread lead-in.

Other drawbacks of the FtF type of thread is that it is subject to high risk of seizure of the joint with the consequent risk of not ensuring the airtight seal of the fluids inside the tube. Due to the seizure effect, torque varies greatly as the screwing operation (make up) of the joint proceeds. This type of joint typically has more turns. This introduces difficulties in making the joint and creates the possibility of imprecision in applying the correct make up torque.

In Crest-to-Root (CtR) Threads (which are used in the threaded connection of the present disclosure), upon make up, contact is made between a pair of mating flanks (load flanks for tension or stabbing flank for compression) and also contact between crest and roots. The CtR thread is designed with interference between crest and roots. In this case the main component of the contact forces (normal to the surface of the crest/root) are placed in a radial direction, and so the interference is achieved taking advantage of the elasticity of a tubular body by deforming geometrically the pipe. Only a minor part of the interference is achieved by the elasticity of the thread teeth, so contact pressures achieved on the teeth are lower than in the case of FtF threads, and so the galling tendency during make up is diminished.

The CtR design of the present disclosure has an optimum fatigue performance and also a very low galling tendency during make up. Therefore, the presence of micro cracks (due to such galling) is minimized.

The present disclosure can be used in integral connections, threaded and coupled connections and in big outside diameter ("OD") threaded connectors, for offshore and onshore applications. There are two major types of big OD threaded connectors used for production risers. The first type is referred to in the art as a "welded" type; the pin and box are machined separately from heavy-wall material and then welded to the pipe. In the second type, referred to in the art as "threaded-and-coupled" type, the pin is typically machined directly onto the pipe ends. The box is machined into each end of a coupling that is used to join the pipe ends together.

Moreover, the design of the present disclosure can be combined with internal and/or external/and or intermediate metal to metal seal configurations, internal and external elastomeric seals, intermediate metal to metal seals and two step threads. For big diameter connectors, stabbing guides and anti-rotation devices can also be used together with the thread profile of this disclosure.

SUMMARY

A threaded connection design having a double ellipse in the thread root for reducing fatigue stress is disclosed herein. In the design of the present disclosure the radius of the stress concentrator (located in the joint between the root and the load flank) is increased using a double ellipse configuration (curved surface having variable radius, not an arc of a circle which has a constant radius). This configuration allows maximizing the radius of the stress concentrator but also minimizes the loss of contact between load flanks, and also minimizes the section of the connection in which the "critical section" is diminished. Another benefit of this profile is that the stress concentrator is put away from the contact points between pin and box so the tensional state on the stress concentrator is more beneficial to the fatigue behavior of the joint. In the new design disclosed herein, maximized contact between load flanks and crest and roots is assured ( ) so the relative movement between parts of the connection is minimized. In general, the profile of the root surface in the present disclosure is composed by a linear portion and a curved portion having a double elliptical profile.

In particular, a design for a male or female threading, which is disposed on an end of a tubular element, is disclosed. The male or female threading includes: a tapered root surface having a first angle of taper (β) measured from a longitudinal axis (aa) of the threading, said tapered root surface being joined tangentially at a first end by a concave curved surface of a constant radius of curvature to a stabbing flank, said tapered root surface being joined at a second end by a convex curved surface of constant radius of curvature to a root groove. The root groove extends from the tapered root surface to a load flank.

The root groove includes: a first portion comprising a first elliptical surface having a variable radius of curvature, said first elliptical surface being part of an ellipse, and said root groove further including a second portion comprising a second elliptical surface having a variable radius of curvature, said second elliptical surface being part of a second ellipse, said second elliptical surface being joined tangentially at a first end to the first elliptical surface at a junction point that defines the bottom of the root groove; and said second elliptical surface being joined tangentially at a second end to the load flank. The bottom of the root groove is disposed in the sidewall of the tubular element below the level of the tapered root surface The tapered root surface (101) includes a first angle of taper (β) measured between the tapered root surface 101 and a longitudinal axis (aa) of the of the threading. In some implementations the first angle of taper (β) is 0 degrees, such that the tapered root surface (101, 301) is parallel to the axis of threading (aa). In other implementations the first angle of taper (β) greater than 0 but less than the measured value of an angle measured between a stabbing flank 220 of the male threading and the axis of threading (aa).

In some implementations an angle theta measured between the axis of threading (aa) and the longitudinal axis (dd) of the sidewall of the tubular element (11) is between 1.5 degrees and 12 degrees.

In the present disclosure, a major axis (cc) of the second ellipse is disposed perpendicular to the load flank; and the major axis (bb) of the first ellipse is perpendicular to the major axis (cc) of the second ellipse. The major axis (bb) of the first ellipse is concurrent with a minor axis of the second ellipse.

In some implementations the first ellipse and the second ellipse are the same size. For example, the first ellipse has a first predetermined diameter (D1) along a major axis (bb), and a second predetermined diameter (D2) along a minor axis; and wherein the second ellipse has a predetermined diameter (D3) along the major axis (cc) that is equal to the diameter (D1) along the major axis (bb) of the first ellipse, and the second ellipse has a second diameter (D4) along a minor axis that is equal to the diameter (D2) along the minor axis of the first ellipse.

In other implementations the ellipses may have differing shapes. For example, the first ellipse has a first predetermined diameter (D1) along a major axis (bb), and a second predetermined diameter (D2) along a minor axis; and wherein the second ellipse has a predetermined diameter (D3) along a major axis (cc) that is equal to the diameter (D1) along the major axis (bb) of the first ellipse, and the second ellipse has a second diameter (D4) along a minor axis that is greater than the diameter (D2) along the minor axis of the first ellipse. In other implementations, the second diameter (D4) along a minor axis of the second ellipse is greater than the diameter (D2) along the minor axis of the first ellipse, but the diameter of D1 may not necessarily be equal to the diameter of D3. In other implementations the second diameter (D4) along a minor axis is less than the diameter (D2) along the minor axis of the first ellipse. In other implementations the diameter (D3) along the major axis (cc) of the second ellipse is less than the diameter D1 along the major axis (bb) of the first ellipse. In other implementations, the diameter (D3) along the major axis (cc) of the second ellipse may be greater than the diameter (D1) along the major axis (bb) of the first ellipse. It will be understood and is expressly disclosed that any combination of one or more of the above ellipse diameter configurations may be combined in the implementation of this invention.

In some implementations, the load flank slopes away from the root groove and an angle measured between the load flank and a line perpendicular to an axis of the threading (aa) is in the range of 0 to 5 degrees. This is referred to in the art as a trapezoidal thread. In other implementations, the load flank slopes toward the root groove and an angle measured between the load flank and a line perpendicular to an axis of the threading (aa) is in the range of 0 to −9 degrees. This is referred to in the art as a hook thread.

The various implementations of the double ellipse root profile of the present invention may be used in a thread connection having a male tubular element including a tapered male threading having an axis of taper (aa), and a female tubular element including a tapered female threading having an axis of taper (aa), said female threading cooperates with the male threading when the threaded connection is made up. The root surface in at least one of the male threading and female threadings includes a tapered root surface having a first angle of taper (β) measured between the tapered root surface 101 and a longitudinal axis (aa) of the threading, said tapered root surface being joined tangentially at a first end by a concave curved surface of a constant radius of curvature to a stabbing flank, said tapered root surface being joined at a second end by a convex curved surface of constant radius of curvature to a root groove. The root groove extends from the tapered root surface to a load flank. The root groove includes: a first portion comprising a first elliptical surface having a variable radius of curvature, said first elliptical surface being part of an ellipse, and said root groove further including a second portion comprising a second elliptical surface having a variable radius of curvature, said second elliptical surface being part of a second ellipse, said second elliptical surface being joined tangentially at a first end to the first elliptical surface at a junction point that defines the bottom of the root groove; and said second elliptical surface being joined tangentially at a second end to the load flank. The bottom of the root groove is disposed in the sidewall of the tubular element below the level of the tapered root surface.

A method is disclosed for cutting a tapered male or female threading of the double ellipse root profile of the present invention. The method includes: providing a tubular element; cutting a tapered male or female threading on an end of said tubular element wherein said tapered male or female threading includes a tapered root surface having a first angle of taper (β) measured between the tapered root surface 101 and a longitudinal axis (aa) of the threading, said tapered root surface being joined tangentially at a first end by a concave curved surface of a constant radius of curvature to a stabbing flank, said tapered root surface being joined at a second end by a convex curved surface of constant radius of curvature to a root groove. The root groove extends from the tapered root surface to a load flank. The root groove includes: a first portion comprising a first elliptical surface having a variable radius of curvature, said first elliptical surface being part of an ellipse, and said root groove further including a second portion comprising a second elliptical surface having a variable radius of curvature, said second elliptical surface being part of a second ellipse, said second elliptical surface being joined tangentially at a first end to the first elliptical surface at a junction point that defines the bottom of the root groove; and said second elliptical surface being joined tangentially at a second end to the load flank. The bottom of the root groove is disposed in the sidewall of the tubular element below the level of the tapered root surface.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 9A is a graphical illustration of finite element analysis generated data showing stress distribution for a standard prior art CtR thread.

Like reference symbols in the various drawings indicate like elements.

DETAILED DESCRIPTION

Figure 1:
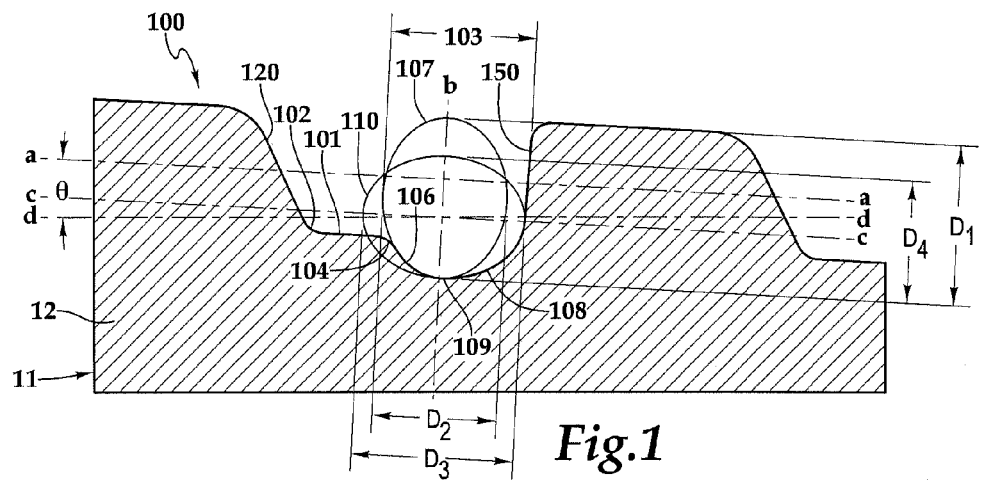
FIG. 1 is a partial cross-section of a first implementation of a threaded connection design having a double ellipse in the thread root for reducing fatigue stress.

Referring to FIG. 1 where therein is illustrated a first implementation of a threaded connection design having a double ellipse in the thread root for reducing fatigue stress. A tubular element has a male threading 100 disposed on a pin end 12 of the tubular element 11. The male threading 100 includes a tapered root surface 101. In the first implementation illustrated in FIG. 1, the tapered root surface 101 is parallel to the axis of threading (aa). The axis of threading (aa) forms an angle θ of approximately 2.4 degrees with a longitudinal axis (dd) of the wall of the tube 11. The range for theta in this implementation may range from about 1.5 degrees to 12 degrees, and more preferably from 1.5 to 4.5 degrees. It will be understood that in this embodiment, since the tapered root surface 101 is parallel to the axis aa of the threading an angle β between the root tapered root surface 101 and the axis of threading (aa) will be equal to 0 degrees. However, in a modification of this embodiment, the angle β may have other values (e.g., see FIG. 2).

The tapered root surface 101 is joined tangentially at a first end by a concave curved surface 102 of a constant radius of curvature to a stabbing flank 120 and the tapered root surface 101 is joined at a second end by a convex curved surface 104 of constant radius of curvature to a root groove 103. The root groove 103 extends from the tapered root surface 101 to a load flank 150.

The root groove 103 includes a first portion comprising a first elliptical surface 106 having a variable radius of curvature. The first elliptical surface 106 is part of an ellipse 107. The root groove 103 further includes a second portion having a second elliptical surface 108 with variable radius of curvature. The second elliptical surface is part of a second ellipse 110. The second elliptical surface 108 is joined tangentially at a first end to the first elliptical surface 106 at a junction point 109 that defines the bottom of the root groove 103. The second elliptical surface is joined tangentially at a second end to the load flank 150.

The bottom of the groove 103 is placed below the level of the tapered root surface 101.

The major axis (bb) of the first ellipse 107 is disposed perpendicular to the major axis (cc) of the second ellipse 110, and the major axis (bb) of the first ellipse 107 is concurrent with (aligned with and overlaying) a minor axis of the second ellipse 110. This configuration ensures that ellipses 107 and 110 join tangentially at the junction point 109.

In the first implementation illustrated in FIG. 1, the major axis (cc) of the second ellipse 110 is disposed perpendicular to the load flank 150. This configuration ensures that the second ellipse 110 is joined tangentially to the load flank 150.

In the first implementation illustrated in FIG. 1, the first ellipse 107 has a first predetermined diameter (D1) along the major axis (bb), and a second predetermined diameter (D2) along a minor axis; and wherein the second ellipse 110 has a predetermined diameter (D3) along the major axis (cc) that is equal to the diameter (D1) along the major axis (bb) of the first ellipse 107, and the second ellipse 110 has a second diameter (D4) along a minor axis that is equal to the diameter (D2) along the minor axis of the first ellipse 107. In this configuration the first ellipse 107 and the second ellipse 110 are identically shaped. Alternatively, it will be understood that in the design of threading 100, the first ellipse 107 and the second ellipse 110 may have different relative diameters. For example, the first ellipse 107 may be longer and narrower than the implementation illustrated in FIG. 1 (e.g., the ellipse may be shaped similar to the ellipse 207 illustrated in FIG. 2).

It will be understood that a female box connection may have the same elements and profile as the male threading 100 illustrated and discussed above.

Figure 5:
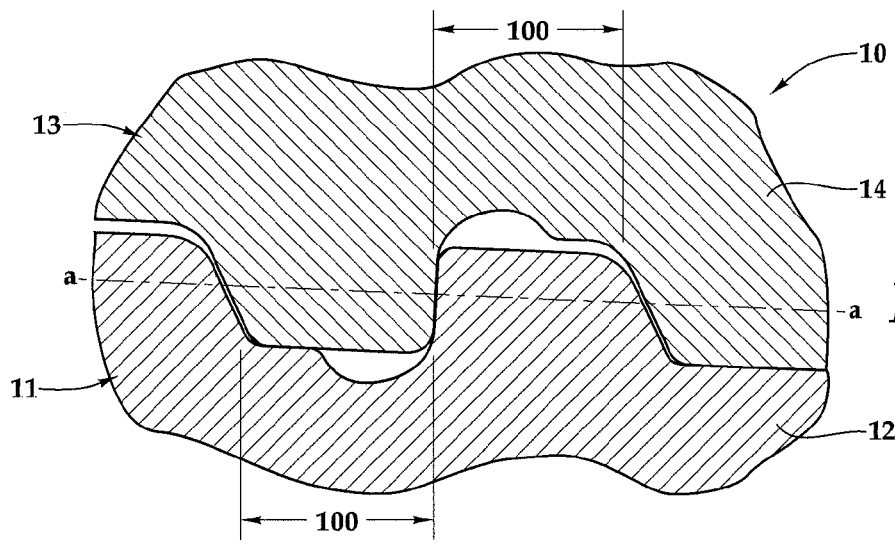
FIG. 5 is a partial cross-section of a tubular connection with a threading profile of FIG. 1.

Referring now to FIG. 5 wherein is illustrated a tubular connection 10 having a first tube 11 with a male pin end 12 with the tapered male threading 100 (as illustrated in FIG. 1) made up to a female box end 14 of a second tube 13. The female box end 14 is illustrated with the same threading profile 100 as the male threading 100. As discussed hereinafter it will be understood that the male threading and the female threading do not have to be identical and either the male threading or the female threading may have modifications as discussed hereinafter.

Figure 1A:
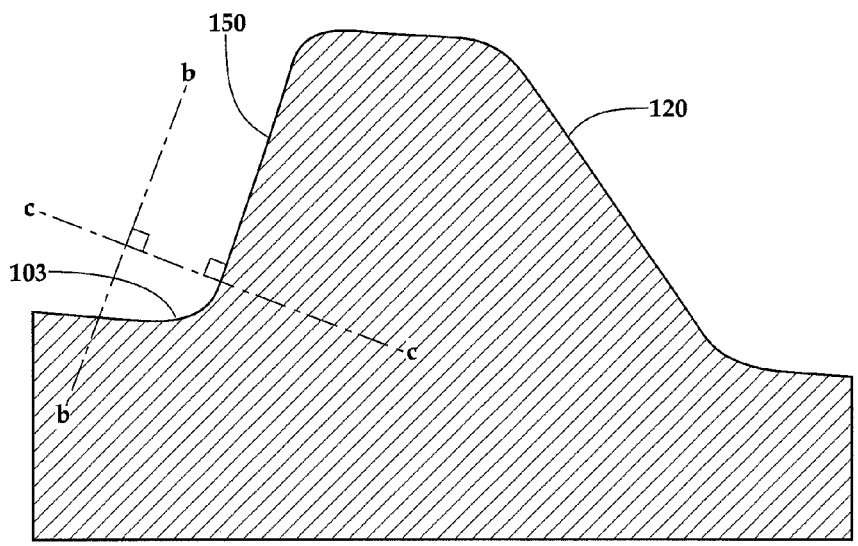
FIG. 1A is an enlarged portion of the cross-section of FIG. 1, wherein the angle of thread taper is further enlarged for illustrative purposes.

In the first implementation illustrated in FIGS. 1, 1A and 5, the load flank 150 is sloped positively away from the root groove 103. (You will note that FIG. 1A has the angle of the load flank 150 exaggerated for illustrative purposes.) Such a thread configuration is referred to in the art as a trapezoidal thread. The angle of the load flank measured with a line perpendicular to the axis (aa) of the threading is generally in the range of 0 to 5 degrees and more preferably from 1.5 to 5 degrees and preferably about 3 degrees. Moreover, angles from 0° (that is to say load flank perpendicular to the axis (aa) of the threading can also be used. In addition, negative flank angles from −9° to 0 (e.g. see FIG. 3a) may also be used for variations of this embodiment. That is to say, the range angle of the load flank may range from −9° to 5° and a preferred range for this embodiment is 1.5° to 5° and the preferred value is 3°.

Figure 2:
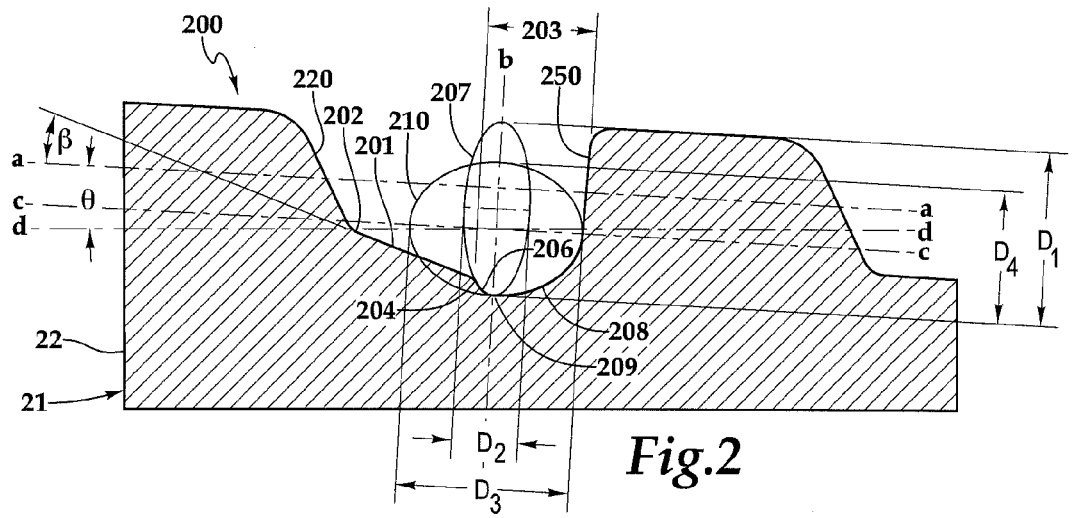
FIG. 2 is a partial cross-section of a second implementation of a threaded connection design having a double ellipse in the thread root for reducing fatigue stress.

Referring to FIG. 2 where therein is illustrated a second implementation of a threaded connection design having a double ellipse in the thread root for reducing fatigue stress. An axis of threading (aa) forms a preferred angle theta of approximately 2.4 degrees with a longitudinal axis (dd) of the wall of the tube 21. The range for theta in this implementation may range from about 1.5 degrees to 12 degrees, and more preferably from 1.5 to 4.5 degrees.

In the second implementation, a tapered threading 200 includes a tapered root surface 201 disposed at an angle of taper (β) measured between the root surface 201 and the axis of taper (aa) of the threading. The angle of taper (β) measured from the axis of taper (aa) of the threading is less than a measured angle between the stabbing flank (220) and the axis aa of the threading The tapered root surface 201 is joined tangentially at a first end by a concave curved surface 202 of a constant radius of curvature to a stabbing flank 220 and the tapered root surface 201 is joined at a second end by a convex curved surface 204 of constant radius of curvature to a root groove 203. The root groove 203 extends from the tapered root surface 201 to a load flank 250.

The root groove 203 includes a first portion having a first elliptical surface 206 with a variable radius of curvature. The first elliptical surface 206 is part of an ellipse 207. The root groove 203 further includes a second portion having a second elliptical surface 208 with a variable radius of curvature. The second elliptical surface is part of a second ellipse 210. The second elliptical surface 208 is joined tangentially at a first end to the first elliptical surface 206 at a junction point 209 that defines the bottom of the root groove 203. The second elliptical surface is joined tangentially at a second end to the load flank 250. The bottom of the groove 203 is placed below the level of the tapered root surface 201.

The major axis (bb) of the first ellipse 207 is disposed perpendicular to the major axis (cc) of the second ellipse 210, and the major axis (bb) of the first ellipse 207 is concurrent with (aligned with and overlaying) a minor axis of the second ellipse 210. This configuration ensures that ellipses 207 and 210 join tangentially at the junction point 209.

In the second implementation illustrated in FIG. 2, the major axis (cc) of the second ellipse 210 is disposed perpendicular to the load flank 250. This configuration ensures that the second ellipse 210 is joined tangentially to the load flank 250.

In the second implementation, the first ellipse 207 has a first predetermined diameter (D1) along a major axis (bb), and a second predetermined diameter (D2) along a minor axis; and wherein the second ellipse 210 has a predetermined diameter (D3) along a major axis (cc) that is equal to the diameter (D1) along the major axis (bb) of the first ellipse 207, and the second ellipse 210 has a second diameter (D4) along a minor axis that is greater than the diameter (D2) along the minor axis of the first ellipse 207. Alternatively, it will be understood that in the design of threading 200, the first ellipse 207 and the second ellipse 210 may have different relative diameters. For example, the second ellipse 210 may have a first diameter (D3) along a major axis that may be greater than the diameter (D1) along the major axis of the first ellipse.

It will be understood that a female box connection may have the same elements and profile as the male threading 200 illustrated and discussed above.

Figure 3:
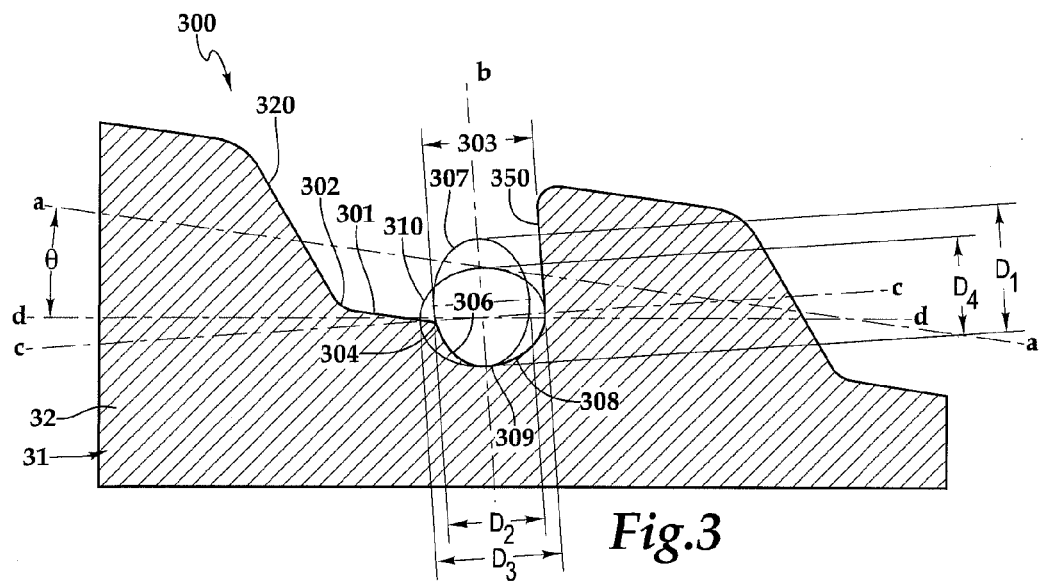
FIG. 3 is a partial cross-section of a third implementation of a threaded connection design having a double ellipse in the thread root for reducing fatigue stress.
Figure 6:
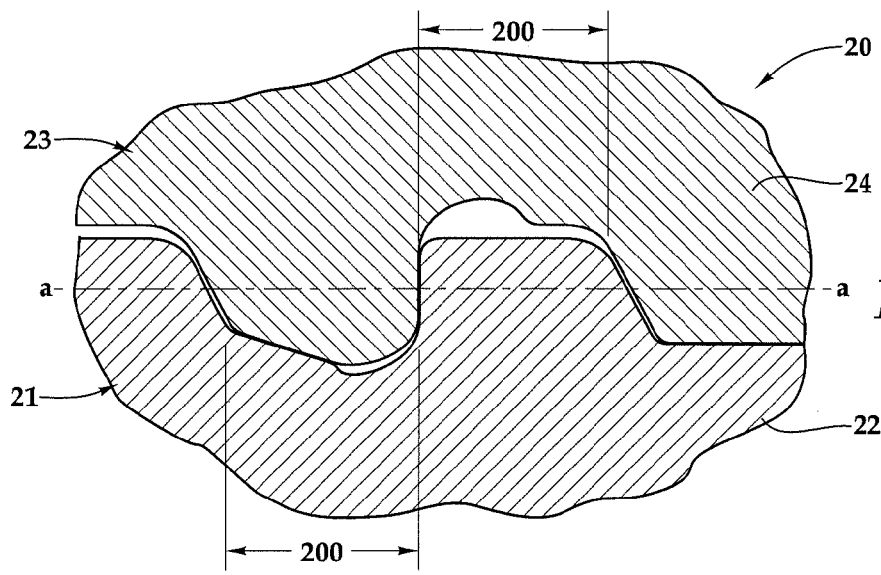
FIG. 6 is a partial cross-section of a tubular connection with a threading profile of FIG. 2.

Referring now to FIG. 6 wherein is illustrated a tubular connection 20 having a first tube 21 with a male pin end 22 with the tapered male threading 200 (as illustrated in FIG. 2) made up to a female box end 24 of a second tube 23. The female box end 24 is illustrated with a modified threading profile 100 (as illustrated in FIG. 3). It will be understood that the male threading and the female threading do not have to be identical as illustrated in FIG. 6, as long as the surfaces are designed to mate properly. It will also be understood that the male threading and female threading may be identical as previously discussed herein with regard to FIGS. 1 and 5.

Figure 2A:
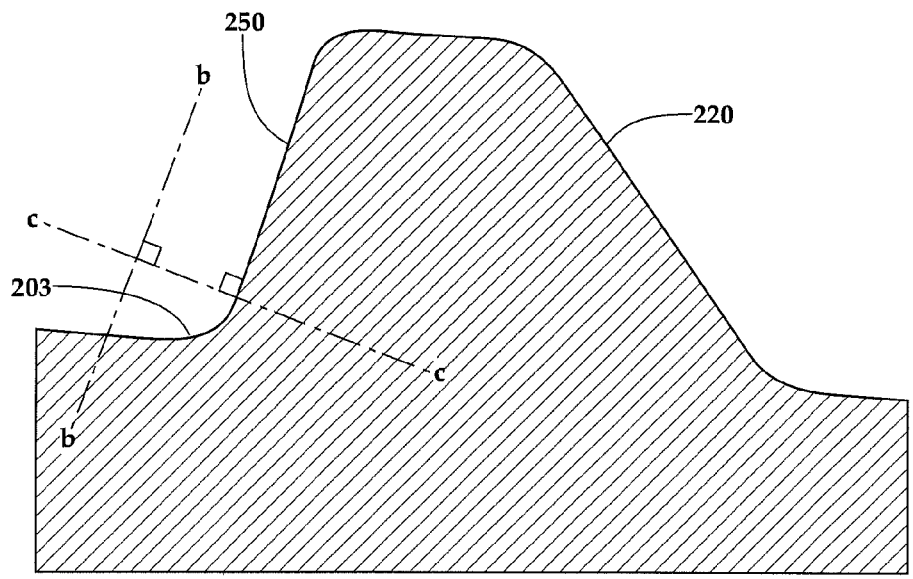
FIG. 2A is an enlarged portion of the cross-section of FIG. 2, wherein the angle of thread taper is further enlarged for illustrative purposes.

In the second implementation (see FIGS. 2, 2A and 6), the load flank 250 is sloped positively away from the root groove 203. (You will note that FIG. 2A has the angle of the load flank 150 exaggerated for illustrative purposes). Such a thread configuration is referred to in the art as a trapezoidal thread. The angle of the load flank 250 measured between a line perpendicular to the pipe axis (aa) of the threading is generally in the range of 0 to 5 degrees and more preferably from 1.5 to 5 degrees and preferably about 3 degrees. In variations of this embodiment and angle of 0° (that is to say load flank perpendicular to the axis (aa) can also be used. In addition, negative flank angles from −9° to 0 (e.g. see FIG. 3) may also be used for this embodiment. That is to say, the angle of the load flank may range from −9° to 5° with a preferred range for this embodiment of 1.5° to 5° and the preferred value being 3°.

Referring to FIG. 3 where therein is illustrated a third implementation of a threaded connection design 300 having a double ellipse in the thread root for reducing fatigue stress. The tapered male threading 300 includes a tapered root surface 301. The axis of the threading (aa) forms a preferred angle theta with the longitudinal axis of the tube (dd) of approximately 8 degrees. The range for theta in this implementation may range from about 1.5° to 12 degrees and more preferably from 4.5 degrees to 12 degrees.

In the third implementation illustrated in FIG. 3, the tapered root surface 301 is parallel to the axis of threading (aa) as in the implementation of FIG. 1. It will be understood that in this embodiment, since the tapered root surface 301 is parallel to the axis aa of the threading an angle β between the root tapered root surface 301 and the axis of threading (aa) will be equal to 0 degrees. However, in a modification of this embodiment, the angle β may have other values (e.g. see FIG. 2).

The tapered root surface 301 is joined tangentially at a first end by a concave curved surface 302 of a constant radius of curvature to a stabbing flank 320 and the tapered root surface 301 is joined at a second end by a convex curved surface 304 of constant radius of curvature to a root groove 303. The root groove 303 extends from the tapered root surface 301 to a load flank 350.

The root groove 303 includes a first portion having a first elliptical surface 306 with a variable radius of curvature. The first elliptical surface 306 being part of an ellipse 307. The second elliptical surface is part of a second ellipse 310. The root groove 303 further includes a second portion having a second elliptical surface 308 with a variable radius of curvature. The second elliptical surface 308 is joined tangentially at a first end to the first elliptical surface 306 at a junction point 309 that defines the bottom of the root groove 303. The second elliptical surface is joined tangentially at a second end to the load flank 350. The bottom of the groove 303 is placed below the level of the tapered root surface 301.

In the third implementation illustrated in FIG. 3, the first ellipse 307 has a first predetermined diameter (D1) along the major axis (bb), and a second predetermined diameter (D2) along a minor axis; and wherein the second ellipse 310 has a predetermined diameter (D3) along the major axis (cc) that is equal to the diameter (D1) along the major axis (bb) of the first ellipse 307, and the second ellipse 310 has a second diameter (D4) along a minor axis that is equal to the diameter (D2) along the minor axis of the first ellipse 307. Alternatively, it will be understood that in the design of threading 300, the first ellipse 307 and the second ellipse 110 may have different relative diameters. For example, the first ellipse 307 may be longer and narrower than the implementation illustrated in FIG. 3 (e.g., the ellipse may be shaped similar to the ellipse 207 illustrated in FIG. 2).

The major axis (bb) of the first ellipse 307 is disposed perpendicular to the major axis (cc) of the second ellipse 310, and the major axis (bb) of the first ellipse 307 is concurrent with (aligned with and overlaying) a minor axis of the second ellipse 310. This configuration ensures that ellipses 307 and 310 join tangentially at the junction point 309.

In the third implementation illustrated in FIG. 3, the major axis (cc) of the second ellipse 310 is disposed perpendicular to the load flank 350. This configuration ensures that the second ellipse 310 is joined tangentially to the load flank 350. All orientations of other axis are defined with respect to axis cc of the second ellipse 310.

It will be understood that a female box connection may have the same elements and profile as the male threading 300 illustrated and discussed above.

Figure 7:
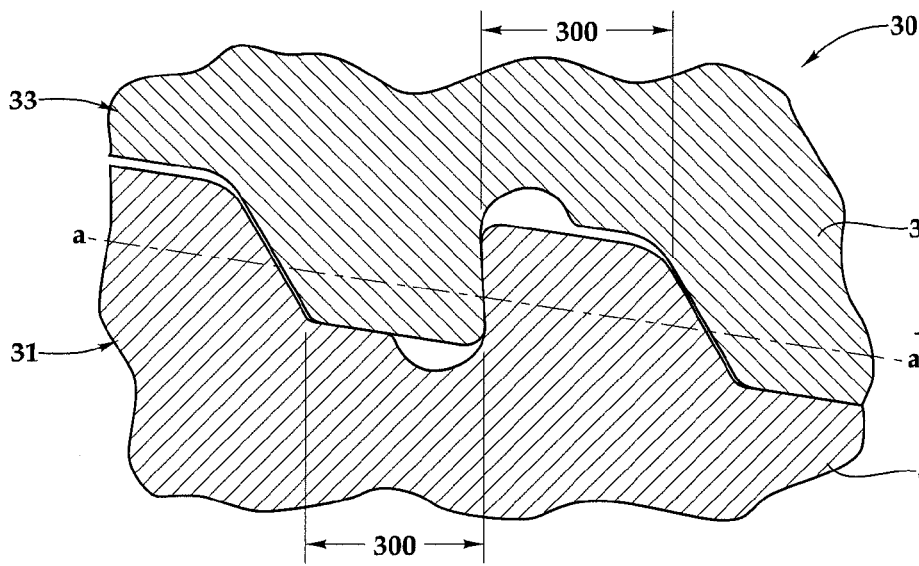
FIG. 7 is a partial cross-section of a tubular connection with a threading profile of FIG. 3.

Referring now to FIG. 7 wherein is illustrated a tubular connection 30 having a first tube 31 with a male pin end 32 with the tapered male threading 300 (as illustrated in FIG. 3) made up to a female box end 34 of a second tube 33. The female box end 34 is illustrated with the same threading profile 300 as the male threading 300. As discussed previously herein with regard to FIGS. 2 and 6, it will be understood that the male threading and the female threading do not have to be identical and either the male threading or the female threading may have modifications as long as the profiles mate together.

Figure 3A:
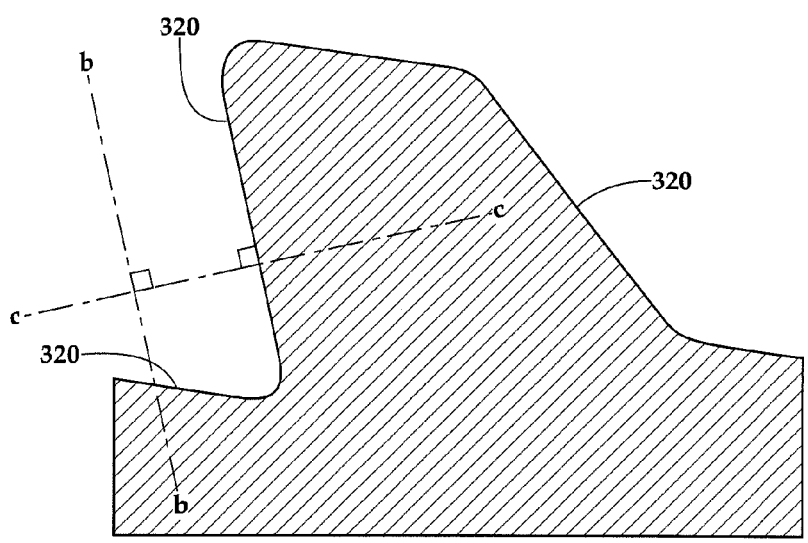
FIG. 3A is an enlarged portion of the cross-section of FIG. 3, wherein the angle of thread taper is further enlarged for illustrative purposes.

In the third implementation illustrated in FIGS. 3, 3A and 7, the load flank 350 is sloped toward the root groove 303. (You will note that FIG. 3A has the angle of the load flank 350 exaggerated for illustrative purposes.) Such a thread configuration is referred to in the art as a hook thread. The angle of the load flank measured with a line perpendicular to the axis (aa) of the threading is generally in the range of −9 to 0 degrees and more preferably from −9 to −1.5 degrees and preferably about −3 degrees. Moreover, angles from 0° (that is to say load flank perpendicular to the axis (aa) can also be used. In addition, positive flank angles from 0° to 5 degrees (e.g. see FIG. 1a) may also be used for variations of this embodiment. That is to say, the range angle of the load flank may range from −9° to 5, a more preferably the angle may range between −9 to −1.5 and a preferred value for this embodiment is −3°.

The present disclosure also includes a method of cutting a male or female threading 100, 200, 300 on an end of a tubular element. The method includes: providing a tubular element 11, 21, 31, 13, 23, 33; cutting a tapered male or female threading on a respective pin end 12, 22, 32 or box end 14, 24, 34 of the tubular element wherein the tapered threading includes a root surface 101, 201, 301. The tapered root surface 101, 201, 301 is joined tangentially at a first end by a concave curved surface 102, 202, 302 of a constant radius of curvature to a stabbing flank 120, 220, 320. The tapered root surface 101, 201, 301 is joined at a second end by a convex curved surface 104 of constant radius of curvature to a root groove 103. The root groove 103, 203, 303 extends from the tapered root surface 101, 201, 301 to a load flank 150, 250, 350. The root groove 103, 203, 303 includes: a first portion comprising a first elliptical surface 106, 206, 306 having a variable radius of curvature, said first elliptical surface 106, 206, 306 being part of an ellipse 107, 207, 307, and the root groove 103, 203, 303 further including a second portion comprising a second elliptical surface 108, 208, 308 having variable radius of curvature, said second elliptical surface being a part of the second ellipse 110, 210, 310. The second elliptical surface 108, 208, 308 is joined tangentially at a first end to the first elliptical surface 106, 206, 306 at a junction point that defines the bottom of the groove 109, 209, 309. The second elliptical surface is joined tangentially at a second end to the load flank 105, 205, 305. The second elliptical surface has its major axis (cc) perpendicular to the load flank 150, 250, 350. The major axis bb is perpendicular to the major axis cc. Orientation of axis is defined having in mind that cc should be perpendicular to the load flank and that bb and cc should be one perpendicular to the other.

Advantages of Present Invention

The root profile design of the present disclosure improves fatigue resistance of the threaded connection by a combined action of several features which manifest themselves at the end of the make up operation of the connection:

a) provision of large radial loads ("hoop loads"), as a function of root-to-crest interference. The large hoop loads improve fatigue resistance;

b) provision of large shoulder loads that improve fatigue resistance; and c) provision of an lengthened radius Rb (of the arc of the curve the connects the root to the flank) lowers stress concentration in the thread roots.

The present thread design configuration of two ellipses allows maximization of the radius of the stress concentrator in the joint between the load flank 150, 250, 350 and the root surface 101, 201, 301, so the effect of the stress concentrator on the fatigue performance of the joint is minimized. Moreover, the effective contact between mating load flanks of the male and female element 12 and 14 of the connection 10 is also maximized and hence efficiency of the connection is also maximized.

Figure 4A:
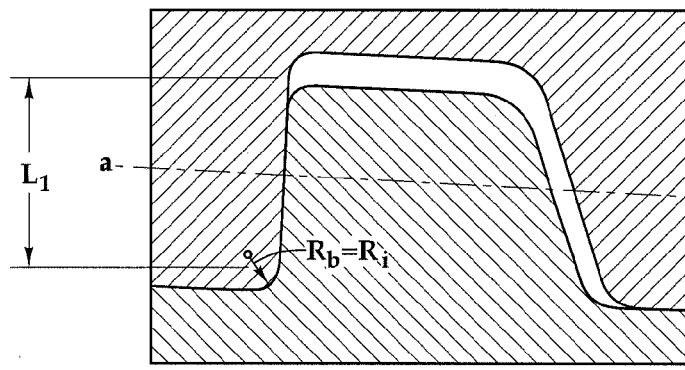
FIGS. 4A to 4D are partial cross-sections illustrating different root profiles of a Crest-to-Root ("CtR") thread.
Figure 4B:
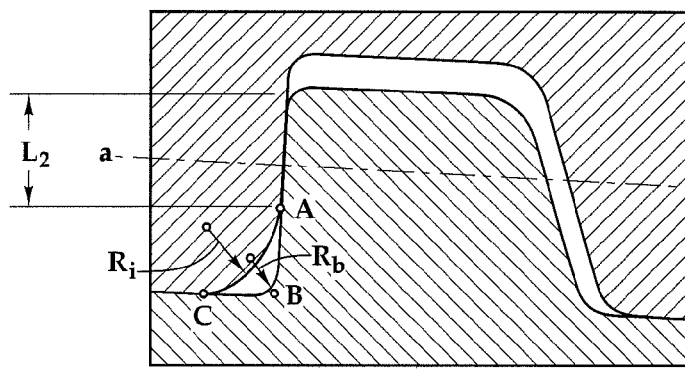
Figure 4C:
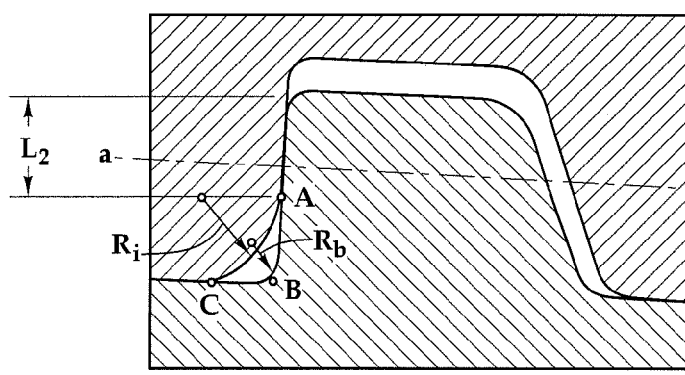
Figure 4D:
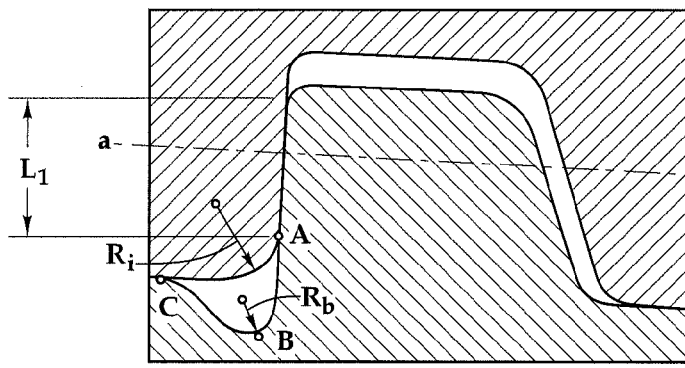

FIGS. 4A, 4B, 4C and 4D illustrate problems and benefits of incremental change in design configuration from the prior art standard CtR design of FIG. 4A to an exemplary root design of the present disclosure as illustrated in FIG. 4D. In FIGS. 4A to 4D, Rb is the radius of the arc connecting the root of the male thread to the load flank of the male thread. Ri is the radius of the arc connecting the thread crest and the load flank of the female thread. See FIG. 4A wherein the Rb and the Ri are equal.

Referring to FIG. 4A, wherein is illustrated a full load flank contact. Problem: contact pressures over the stress concentrator and low stress concentrator radius (Rb). Benefit: High tension efficiency due to maximized load flank contact L1.

Referring to FIG. 4B wherein is illustrated a modified CtR profile (similar to prior art design of US 20110042946 A1). Benefit: The radius Ri is enlarged to avoid contact points over the stress concentrator. Problem: The stress state near the stress concentrator is highly affected by contact stresses and remote stresses. Another problem of this configuration is the low stress concentrator radius (Rb). This configuration has the same Rb as in FIG. 4A.

Referring to FIG. 4C to maximize the stress concentrator radius Rb, there is the limit of (Rb), because it is important to avoid full load flank contact. Moreover, when increasing Rb the effect of contact stresses in the stress state around the stress concentrator becomes bigger because points A and C are closer to B.

Referring to FIG. 4D wherein the stress concentrator radius (RI) of the male thread has been enlarged to maximize load flank contact and crest to root contact. Moreover, the stress state in the stress concentrator is less influenced by contact stresses and is only a function of remote stresses, due to the fact that contact points A and C are spaced farther away from the stress concentrator. With this geometry, contact surface L1 is restored but without contact in the stress concentrator.

Referring to FIG. 4B (a prior art design similar to US 2011 0042946 A1) and FIG. 4D (an implementation of the present root design), another benefit of using the double elliptical groove as illustrated in FIGS. 1, 2 and 3 of the present disclosure is that the stress state around the stress concentrator (KT) is less affected by the components of stresses due to contact points ($\sigma_A+\sigma_C$), and so values of stresses are lower than the ones obtained for a joint without a groove and only affected by remote stresses ($\sigma_B$).

In some prior art CtR threads (see FIG. 4B), the stress state around the stress concentrator KT is a function of contact stresses ($\sigma_A+\sigma_C$) and remotes stresses ($\sigma_B$):

$$\sigma_{KT}=\sigma_A+\sigma_B+\sigma_C$$

However, in the joint of the present disclosure (see FIG. 4D), contact points A and C are far away from the stress concentrator, so the stress state around the stress concentrator KT is a function only of the remotes stresses ($\sigma_B$):

$$\sigma_{KT}=\sigma_B$$

It is important to note that the choice of ellipses to form the groove is based on the fact that the ellipses are functions that allow joining two perpendicular surfaces with a curved surface that has a radius that varies from point to point. Therefore, the radiuses can be maximized and minimized. For example, an arc of circle having the same radius as the radius of the ellipse in the KT will remove all possibility of contact between load flanks (see FIGS. 1 to 3).

The use of a second ellipse to go from the load flank to the KT is used to maximize the radius of the KT, then the design switches to the first ellipse to quickly restore crest to root contact. This design provides a minimal removal of crest to root contact surface. Therefore, contact pressures are maintained low (see FIGS. 1 to 3).

To enhance the effect of the first ellipse, it can be narrowed as illustrated in the second implementation of the present disclosure (see FIG. 2).

Additionally increasing the taper of the tapered portion of the root surface as illustrated in the second implementation (FIG. 2), the contact surface between crest and root is enlarged and so contact pressures are minimized and galling is minimized. The contact length at crest/root is approximately double in the second implementation as compared to the design illustrated in the first implementation. This design minimizes galling. Additionally, positive (major than 0) angle of taper ($\beta$) measured from the axis of taper (aa) of the threading helps to maintain the thread locked. ($\beta$) angle is also useful in enlarging the crest/root contact surface and at the same time provides for additional room for the groove for stress reduction at the pin root (see FIG. 2).

Figure 8A:
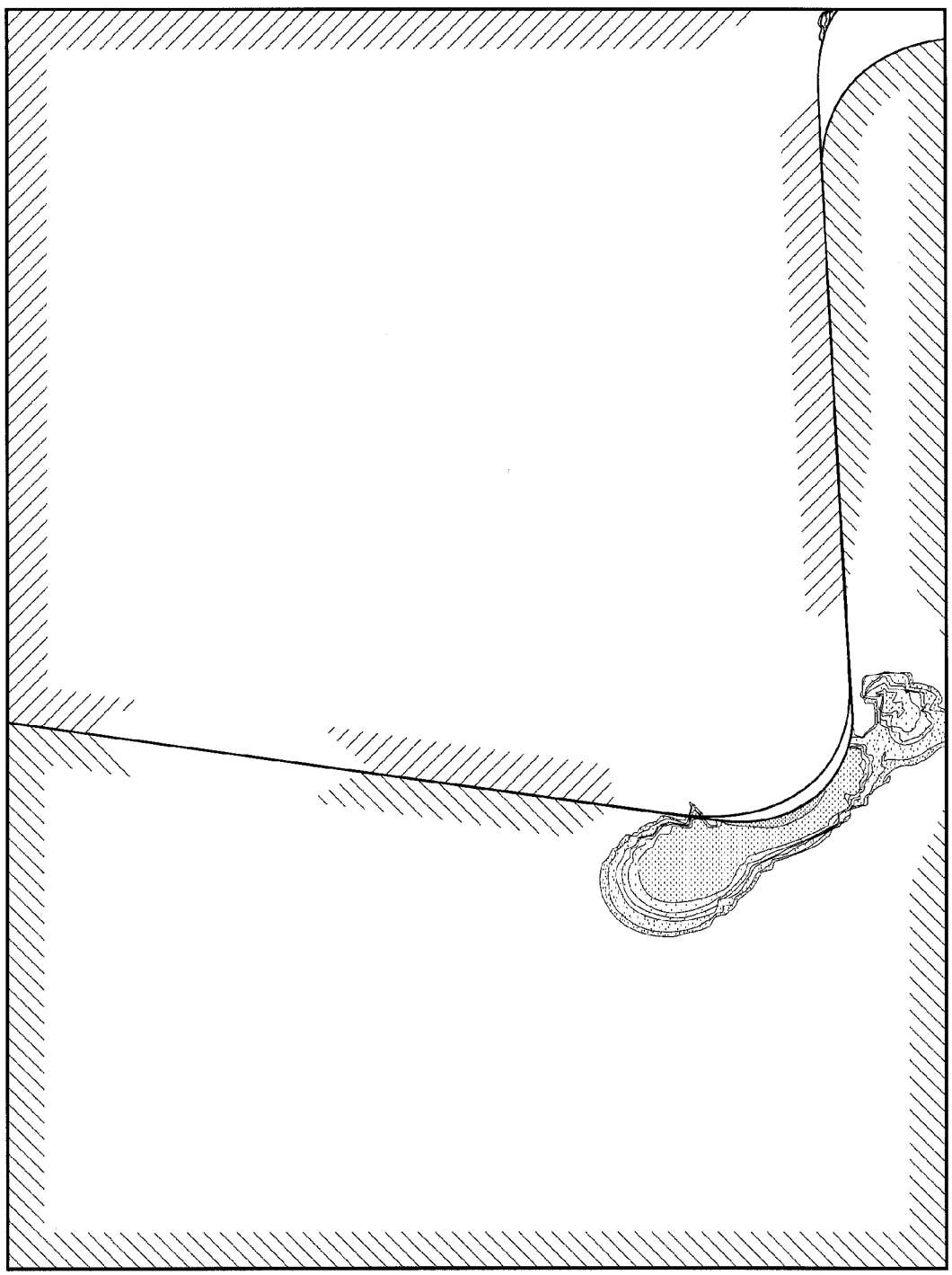
FIG. 8A is a graphical illustration of finite element analysis generated data showing estimated cycles to fatigue failure for a standard prior art CtR thread.
Figure 8B:
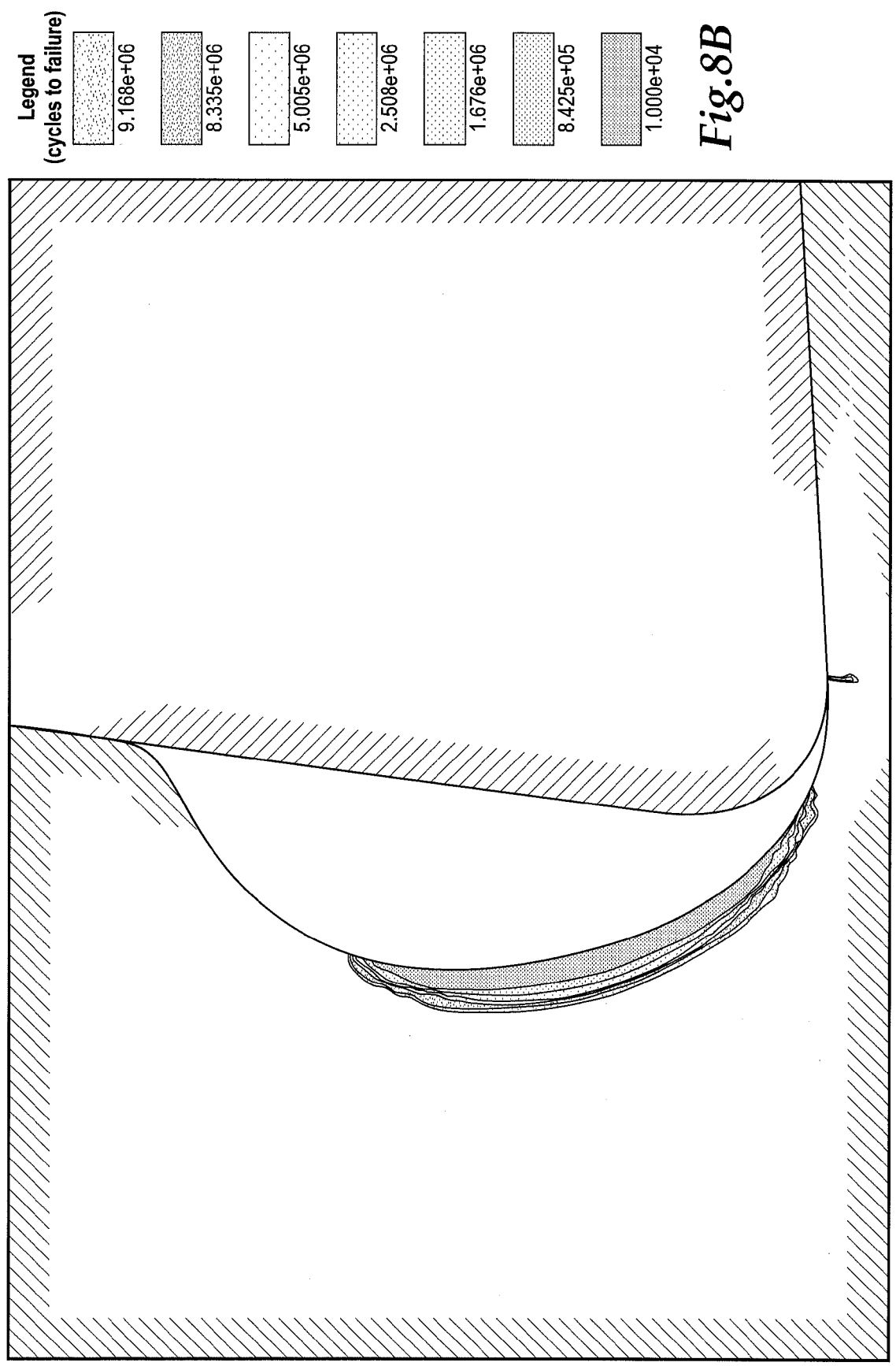
FIG. 8B is a graphical illustration of finite element analysis generated data showing estimated cycles to fatigue failure for a double elliptical thread of the present disclosure.

Referring now to FIGS. 8A, 8B, 9A and 9B, wherein finite element analysis has been used to generate data comparing parameters for a standard Crest to Root (CtR) thread (as illustrated in FIG. 4A) to the exemplary double elliptical design of the present disclosure (as illustrated in FIG. 4D). In FIG. 8A the cycles to fatigue failure is illustrated for the standard CtR thread design. In FIG. 8B the cycles to fatigue failure are illustrated for the double elliptical design of the present disclosure. It can be seen in FIGS. 8A and 8B how the double elliptical design of the present invention directly impacts on the number of cycles to failure in the zone where the stress concentrator is placed. The first layer of material (in the area of the stress concentrator, that is to say the joint between load flank and root surface) in the standard CtR design is the one having less number of cycles $1.120 \times 10^{+3}$ to fatigue failure (FIG. 8A), while dotted area (area near the stress concentrator) in the double elliptic profile (FIG. 8B) is the one having less number of cycles $1.0 \times 10^{+4}$. It can be seen that the fatigue life of the component is increased with the double elliptical design of the present invention.

Figure 9B:
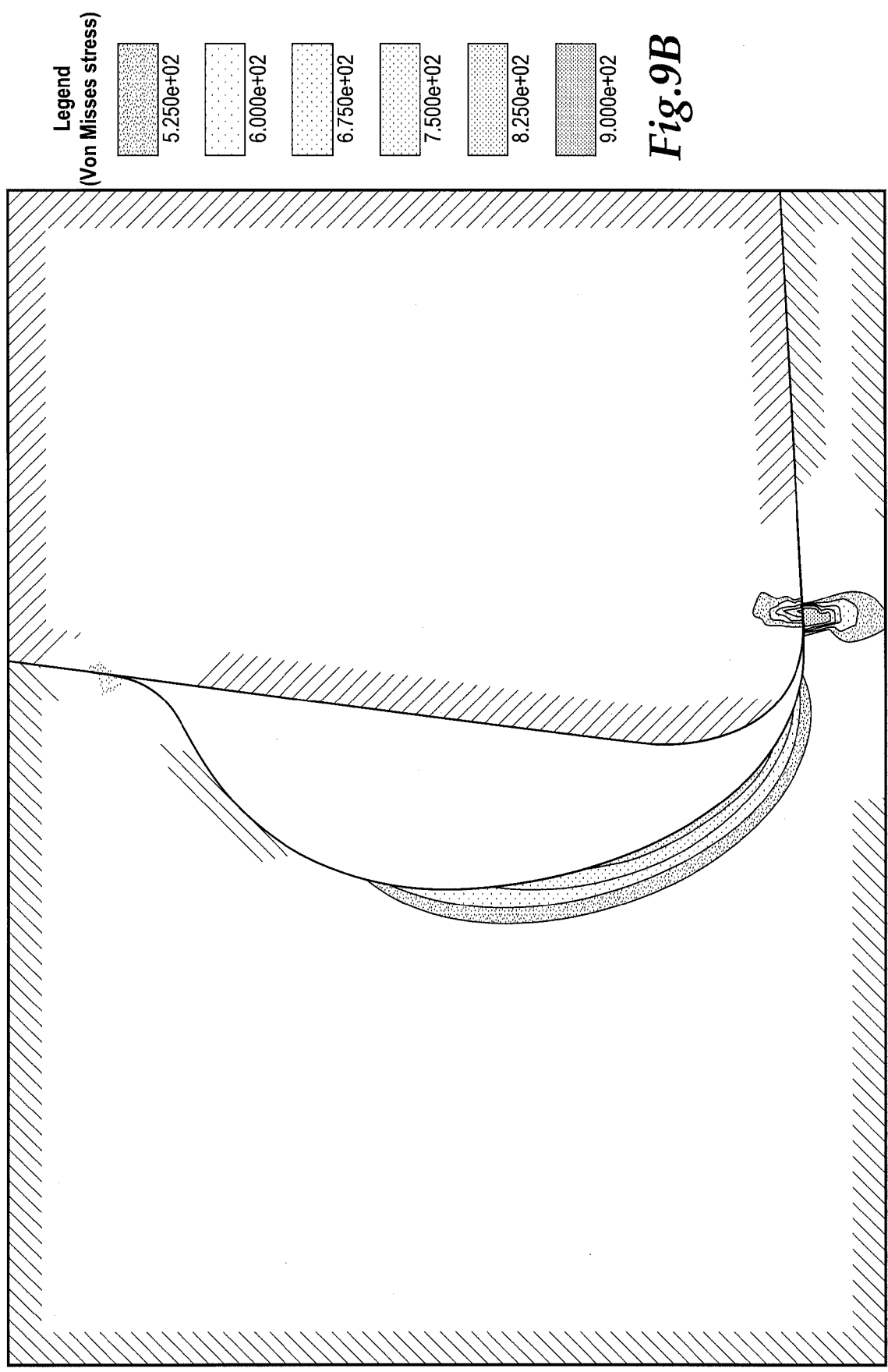
FIG. 9B is a graphical illustration of finite element analysis generated data showing stress distribution for a double elliptical thread of the present disclosure.

Referring to FIGS. 9A and 9B, the stress distribution and representative von Misses values for the standard CtR thread is illustrated in FIG. 9A and the double elliptical thread profile of the present disclosure is illustrated in FIG. 9B. It can be seen that in FIG. 9A (prior art CtR design), high values of von Misses stress exist around the stress concentrator and near the contact points between the male and female thread near the stress concentrator. However, FIG. 9B, (the double elliptical thread profile of the present inventions) demonstrates a lower level of stress values and a more uniform distribution of stress near the stress concentrator. The contact points between the male and female members are desirably spaced apart from the stress concentrator and therefore not contributing to the stress state of the area near the stress concentrator.

A number of embodiments of the invention have been described. Nevertheless, it will be understood that various modifications may be made without departing from the spirit and scope of the invention. Accordingly, other embodiments are within the scope of the following claims.

What is claimed is:

1. A method of cutting a tapered male threading on an end of a tubular element, said method comprising:
   providing a tubular element;
   cutting a tapered male threading on an end of said tubular element wherein said tapered male threading comprises: a tapered root surface having a first angle of taper (β) measured between the tapered root surface and a longitudinal axis (aa) of threading, said tapered root surface being joined tangentially at a first end by a concave curved surface of a constant radius of curvature to a stabbing flank, said tapered root surface being joined at a second end by a convex curved surface of constant radius of curvature to a root groove;
   said root groove extending from the tapered root surface to a load flank, said root groove including:
      a first portion comprising a first elliptical surface having a variable radius of curvature, said first elliptical surface being part of an ellipse, and
      said root groove further including a second portion comprising a second elliptical surface having a variable radius of curvature, said second elliptical surface being part of a second ellipse, said second elliptical surface being joined tangentially at a first end to the first elliptical surface, and said second elliptical surface being joined tangentially at a second end to the load flank.

2. The method of cutting a tapered male threading of claim 1 wherein the first angle of taper (β) is 0 degrees, such that the tapered root surface is parallel to the axis of threading (aa).

3. The method of cutting a tapered male threading of claim 1 wherein the first angle of taper (β) is less than the measured value of an angle measured between a stabbing flank of the male threading and the axis of threading (aa).

4. The method of cutting a tapered male threading of claim 1 wherein an angle theta measured between the axis of threading (aa) and the longitudinal axis (dd) of the sidewall of the tubular element is between 1.5 degrees and 12 degrees.

5. The method of cutting a tapered male threading of claim 1 wherein a major axis (cc) of the second ellipse is disposed perpendicular to the load flank.

6. The method of cutting a tapered male threading of claim 1 wherein a major axis (bb) of the first ellipse is perpendicular to a major axis (cc) of the second ellipse.

7. The method of cutting a tapered male threading of claim 1 wherein a major axis (bb) of the first ellipse is aligned with a minor axis of the second ellipse.

8. The method of cutting a tapered male threading of claim 1 wherein the first ellipse has a first predetermined diameter (D1) along a major axis (bb), and a second predetermined diameter (D2) along a minor axis; and wherein the second ellipse has a predetermined diameter (D3) along a major axis (cc) that is equal to the diameter (D1) along the major axis (bb) of the first ellipse, and the second ellipse has a second diameter (D4) along a minor axis that is equal to the diameter (D2) along the minor axis of the first ellipse.

9. The method of cutting a tapered male threading of claim 1 wherein the first ellipse has a first predetermined diameter (D1) along a major axis (bb), and a second predetermined diameter (D2) along a minor axis; and wherein the second ellipse has a predetermined diameter (D3) along a major axis (cc) that is equal to the diameter (D1) along the major axis (bb) of the first ellipse, and the second ellipse has a second diameter (D4) along a minor axis that is greater than the diameter (D2) along the minor axis of the first ellipse.

10. The method of cutting a tapered male threading of claim 1 wherein the first ellipse has a first predetermined diameter (D1) along a major axis (bb), and a second predetermined diameter (D2) along a minor axis; and wherein the second ellipse has a predetermined diameter (D3) along a major axis (cc) and has a second diameter (D4) along a minor axis that is greater than the diameter (D2) along the minor axis of the first ellipse.

11. The method of cutting a tapered male threading of claim 1 wherein the first ellipse has a first predetermined diameter (D1) along a major axis (bb), and a second predetermined diameter (D2) along a minor axis; and wherein the second ellipse has a predetermined diameter (D3) along a major axis (cc) and has a second diameter (D4) along a minor axis that is less than the diameter (D2) along the minor axis of the first ellipse.

12. The method of cutting a tapered male threading of claim 1 wherein the first ellipse has a first predetermined diameter (D1) along a major axis (bb), and a second predetermined diameter (D2) along a minor axis; and wherein the second ellipse has a predetermined diameter (D3) along a major axis (cc) and has a second diameter (D4) along a minor axis; and wherein the diameter (D3) along the major axis (cc) of the second ellipse is less than the diameter D1 along the major axis (bb) of the first ellipse.

13. The method of cutting a tapered male threading of claim 1 wherein the first ellipse has a first predetermined diameter (D1) along a major axis (bb), and a second predetermined diameter (D2) along a minor axis; and wherein the second ellipse has a predetermined diameter (D3) along a major axis (cc) and has a second diameter (D4) along a minor axis; and wherein the diameter (D3) along the major axis (cc) of the second ellipse is greater than the diameter (D1) along the major axis (bb) of the first ellipse.

14. The method of cutting a tapered male threading of claim 1 wherein the load flank is disposed in relation to an angle measured between the load flank and a line perpendicular to an axis of the threading (aa), wherein said angle ranges from −9 to 5 degrees.

15. The method of cutting a tapered male threading of claim 1 wherein the second elliptical surface is joined tangentially at a first end to the first elliptical surface at a junction point that defines the bottom of the root groove.

16. A method of cutting a tapered female threading on an end of a tubular element, said method comprising:
   providing a tubular element;
   cutting a tapered female threading on an end of said tubular element wherein said tapered female threading comprises:
   a tapered root surface having a first angle of taper (β) measured between the tapered root surface and a longitudinal axis (aa) threading, said tapered root surface being joined tangentially at a first end by a concave curved surface of a constant radius of curvature to a stabbing flank, said tapered root surface being joined at a second end by a convex curved surface of constant radius of curvature to a root groove;
   said root groove extending from the tapered root surface to a load flank, said root groove including:
   a first portion comprising a first elliptical surface having a variable radius of curvature, said first elliptical surface being part of an ellipse, and
   said root groove further including a second portion comprising a second elliptical surface having a variable radius of curvature, said second elliptical surface being part of a second ellipse, said second elliptical surface being joined tangentially at a first end to the first elliptical surface, and said second elliptical surface being joined tangentially at a second end to the load flank.

17. The method of cutting a tapered female threading of claim 16 wherein the first angle of taper (β) is 0 degrees, such that the tapered root surface is parallel to the axis of threading (aa).

18. The method of cutting a tapered female threading of claim 16 wherein the first angle of taper (β) is less than the measured value of an angle measured between a stabbing flank of the male threading and the axis of threading (aa).

19. The method of cutting a tapered female threading of claim 16 wherein an angle theta measured between the axis of threading (aa) and the longitudinal axis (dd) of the sidewall of the tubular element is between 1.5 degrees and 12 degrees.

20. The method of cutting a tapered female threading of claim 16 wherein a major axis (cc) of the second ellipse is disposed perpendicular to the load flank.

21. The method of cutting a tapered female threading of claim 16 wherein a major axis (bb) of the first ellipse is perpendicular to a major axis (cc) of the second ellipse.

22. The method of cutting a tapered female threading of claim 16 wherein a major axis (bb) of the first ellipse is aligned with a minor axis of the second ellipse.

23. The method of cutting a tapered female threading of claim 16 wherein the first ellipse has a first predetermined diameter (D1) along a major axis (bb), and a second predetermined diameter (D2) along a minor axis; and wherein the second ellipse has a predetermined diameter (D3) along a major axis (cc) that is equal to the diameter (D1) along the major axis (bb) of the first ellipse, and the second ellipse has a second diameter (D4) along a minor axis that is equal to the diameter (D2) along the minor axis of the first ellipse.

24. The method of cutting a tapered female threading of claim 16 wherein the first ellipse has a first predetermined diameter (D1) along a major axis (bb), and a second predetermined diameter (D2) along a minor axis; and wherein the second ellipse has a predetermined diameter (D3) along a major axis (cc) that is equal to the diameter (D1) along the major axis (bb) of the first ellipse, and the second ellipse has a second diameter (D4) along a minor axis that is greater than the diameter (D2) along the minor axis of the first ellipse.

25. The method of cutting a tapered female threading of claim 16 wherein the first ellipse has a first predetermined diameter (D1) along a major axis (bb), and a second predetermined diameter (D2) along a minor axis; and wherein the second ellipse has a predetermined diameter (D3) along a major axis (cc) and has a second diameter (D4) along a minor axis that is greater than the diameter (D2) along the minor axis of the first ellipse.

26. The method of cutting a tapered female threading of claim 16 wherein the first ellipse has a first predetermined diameter (D1) along a major axis (bb), and a second predetermined diameter (D2) along a minor axis; and wherein the second ellipse has a predetermined diameter (D3) along a major axis (cc) and has a second diameter (D4) along a minor axis that is less than the diameter (D2) along the minor axis of the first ellipse.

27. The method of cutting a tapered female threading of claim 16 wherein the first ellipse has a first predetermined diameter (D1) along a major axis (bb), and a second predetermined diameter (D2) along a minor axis; and wherein the second ellipse has a predetermined diameter (D3) along a major axis (cc) and has a second diameter (D4) along a minor axis; and wherein the diameter (D3) along the major axis (cc) of the second ellipse is less than the diameter D1 along the major axis (bb) of the first ellipse.

28. The method of cutting a tapered female threading of claim 16 wherein the first ellipse has a first predetermined diameter (D1) along a major axis (bb), and a second predetermined diameter (D2) along a minor axis; and wherein the second ellipse has a predetermined diameter (D3) along a major axis (cc) and has a second diameter (D4) along a minor axis; and wherein the diameter (D3) along the major axis (cc) of the second ellipse is greater than the diameter (D1) along the major axis (bb) of the first ellipse.

29. The method of cutting a tapered female threading of claim 16 wherein the load flank is disposed in relation to an angle measured between the load flank and a line perpendicular to an axis of the threading (aa), wherein said angle ranges from −9 to 5 degrees.

30. The method of cutting a tapered female threading of claim 16 wherein the second elliptical surface is joined tangentially at a first end to the first elliptical surface at a junction point that defines the bottom of the root groove.

* * * * *